(12) United States Patent
Huang et al.

(10) Patent No.: US 12,035,835 B2
(45) Date of Patent: Jul. 16, 2024

(54) MULTIFUNCTIONAL COOKER

(71) Applicant: GUANGDONG SHUNDE OUNING TECHNOLOGY ELECTRICAL APPLIANCE CO., LTD., Guangdong (CN)

(72) Inventors: Zhenxiong Huang, Guangdong (CN); Yun Yang, Guangdong (CN)

(73) Assignee: GUANGDONG SHUNDE OUNING TECHNOLOGY ELECTRICAL APPLIANCE CO., LTD., Guangdong (CN)

( * ) Notice: Subject to any disclaimer, the term of this patent is extended or adjusted under 35 U.S.C. 154(b) by 642 days.

(21) Appl. No.: 17/295,050

(22) PCT Filed: Dec. 6, 2018

(86) PCT No.: PCT/CN2018/119544
§ 371 (c)(1),
(2) Date: May 19, 2021

(87) PCT Pub. No.: WO2020/103198
PCT Pub. Date: May 28, 2020

(65) Prior Publication Data
US 2021/0401217 A1 Dec. 30, 2021

(30) Foreign Application Priority Data
Nov. 19, 2018 (CN) .......................... 201821904095.X

(51) Int. Cl.
*A47J 27/086* (2006.01)
*A47J 37/06* (2006.01)

(52) U.S. Cl.
CPC ......... *A47J 27/086* (2013.01); *A47J 37/0641* (2013.01)

(58) Field of Classification Search
CPC .................. A47J 27/086; A47J 27/0641
(Continued)

(56) References Cited

U.S. PATENT DOCUMENTS 6,135,012 A * 10/2000 Kao .................... A47J 27/0802
219/453.11
11,229,315 B2 * 1/2022 Kennedy ............. A47J 37/0641
(Continued)

FOREIGN PATENT DOCUMENTS

| CN | 201691719 | 1/2011 |
| CN | 105902144 | 8/2016 |

(Continued)

OTHER PUBLICATIONS

"International Search Report (Form PCT/ISA/210) of PCT/CN2018/119544", mailed on Aug. 12, 2019, with English translation thereof, pp. 1-5.

*Primary Examiner* — Omar Flores Sanchez
(74) *Attorney, Agent, or Firm* — JCIP GLOBAL INC.

(57) ABSTRACT

A multifunctional cooker, includes a cooker body and cooker covers which are connectable with the cooker body, wherein the multifunctional cooker is provided with at least two cooker covers, the cooker covers is arranged separately with respect to the cooker body, at least one cooker cover is provided with an air fryer assembly, and at least one cooker cover is provided with a pressure cooker assembly. By integrating the functions of pressure cooking and air baking, the switch between pressure cooker function and air fryer function is realized and the purpose of one cooker with multiple functions is realized.

7 Claims, 5 Drawing Sheets

(58) Field of Classification Search
USPC .................................................. 99/325, 326
See application file for complete search history.

(56) References Cited

U.S. PATENT DOCUMENTS

| | | | |
|---|---|---|---|
| 2011/0095015 A1* | 4/2011 | Kao | A47J 27/08 |
| | | | 219/433 |
| 2016/0007788 A1* | 1/2016 | Kim | A47J 27/086 |
| | | | 99/348 |
| 2017/0127881 A1 | 5/2017 | Winter et al. | |
| 2017/0245686 A1* | 8/2017 | Man | A47J 37/1257 |
| 2021/0045569 A1* | 2/2021 | Huang | A47J 27/086 |
| 2022/0000301 A1* | 1/2022 | Huang | A47J 44/00 |

FOREIGN PATENT DOCUMENTS

| | | | |
|---|---|---|---|
| CN | 206119969 | 4/2017 | |
| CN | 108634807 | 10/2018 | |
| CN | 208988575 | 6/2019 | |
| WO | WO-2016148492 A1 * | 9/2016 | A47J 27/08 |
| WO | 2017105076 | 6/2017 | |

\* cited by examiner

MULTIFUNCTIONAL COOKER

CROSS-REFERENCE TO RELATED APPLICATION

This application is a 371 of international application of PCT application serial no. PCT/CN2018/119544, filed on Dec. 6, 2018, which claims the priority benefit of China application no. 201821904095.X, filed on Nov. 19, 2018. The entirety of each of the above mentioned patent applications is hereby incorporated by reference herein and made a part of this specification.

BACKGROUND

Technical Field

The present invention relates to a cookware, and in particular, relates to a multifunctional cooker.

Description of Related Art

Existing consumers' requirements for cooking technology are constantly increasing, and thus bring forth the pursuing for a diet full of color, aroma and taste. Pressure cooking has pressure penetration and can meet certain temperature requirements. In the market, products with this function are generally considered to realize healthy and nutritious cooking. However, after pressure cooking, the surface color and taste of the food may not reach feeling of the crispy and delicious taste. If it can also be baked, the food will be full of color, aroma and taste, with qualities of health and nutrition, and the food will be popular with consumers and has huge market potential. The existing pressure cooker only has the function of pressure cooking. Similarly, the existing air fryer only has the function of baking food by hot air. At present, there are no products which have cooking functions of both pressure cooking and air baking. The present invention integrates the functions of pressure cooking and air baking, and realizes two functions on one product. It can not only realize functions of pressure cooking for rice, porridge, soup and other functions, but also use the product to realize functions of frying potato chips, chicken wings, beef, and spareribs and other functions. It may also use the product to pressure cook and then bake and fry the food, so that the pressure cooking and the baking are used as two cooking stages for the same food, thereby realizing the purpose of one cooker with multiple functions.

SUMMARY

To overcome at least one defect of the above-mentioned prior art, the present invention provides a multifunctional cooker which integrates functions of pressure cooker and air fryer, realizing switch between pressure cooker function and air fryer function and realizing the purpose of one cooker with multiple functions.

In order to solve the above technical problems, the technical solution adopted by the present invention is as follows: a multifunctional cooker, comprising a cooker body and cooker covers which are connectable with the cooker body, wherein the multifunctional cooker is provided with at least two cooker covers, the cooker covers are arranged separately with respect to the cooker body, at least one cooker cover is provided with an air fryer assembly, and at least one cooker cover is provided with a pressure cooker assembly.

In the present technical solution, the multifunctional cooker is provided with at least two cooker covers and the cooker covers are arranged independently with respect to the cooker body, and different cooker covers may be replaced to be used on the cooker body. When the cooker cover provided with the air fryer assembly is used to be cooperated with the cooker body, the air fryer function of the present invention is realized by the cooker cover provided with the air fryer assembly. When the cooker cover provided with the pressure cooker assembly is used to be cooperated with the cooker body, the pressure cooker function of the present invention is realized by the provided pressure cooker assembly. Either the cooker cover provided with the air fryer assembly, or the cooker cover provided with the pressure cooker assembly is selected to be used to be cooperated with the cooker body, thereby realizing the switch between pressure cooker function and air fryer function of the multifunctional cooker.

In one embodiment, the multifunctional cooker is provided with two cooker covers. One cooker cover is provided with an air fryer assembly, and another cooker cover is provided with a pressure cooker assembly. The multifunctional cooker is provided with two cooker covers and either of the two cooker covers is selected to be connected with the cooker body. The cooker cover provided with the pressure cooker assembly is connected with the cooker body to realize the pressure cooker function. The cooker cover provided with the air fryer assembly is connected with the cooker body to realize the air fryer function.

In one embodiment, the air fryer assembly comprises a heating assembly and a wind power assembly. The heating assembly is cooperated with the wind power assembly to act on a space defined by the cooker cover and the cooker body. The heating assembly and the wind power assembly interact with each to realize the flowing of hot air in the space defined by the cooker cover and the cooker body, and realize the air fryer function.

Preferably, a heat insulation member is provided between the heating assembly and the wind power assembly. The heat insulation member isolates the heating assembly and wind power assembly, so as to prevent the high temperature of the heating assembly from damaging the wind power assembly.

Preferably, the heating assembly is a heating tube and the wind power assembly comprises a drive member and a fan. The fan rotates under the action of the driving member and acts on the heating tube to realize the flowing of hot air.

In one embodiment, the pressure cooker assembly comprises a pressure limiting valve assembly and a seal housing which are connected with the cooker cover, and the cooker body is sealed by the sealing housing when the cooker cover is connected with the cooker body. A pressure is released by the pressure limiting valve assembly when the pressure in the cooker body exceeds a threshold value. The pressure cooker assembly comprises the pressure limiting valve assembly and the seal housing, and the pressure limiting valve assembly is used for controlling the pressure in the cooker body and release the pressure when the pressure in the cooker body exceeds the threshold value, and the seal housing realizes the sealed connection between the cooker cover and the cooker body.

Preferably, the pressure limiting valve assembly comprises an exhaust pipe, a protective casing and a valve. The exhaust pipe penetrates the cooker cover, and both ends of the exhaust pipe are connected with the protective casing and the valve respectively. The exhaust pipe penetrates the cooker cover to realize the communication between an inside and an outside of the cooker body, and the pressure in the cooker body is adjusted through the exhaust pipe and the valve. The protective casing is connected to one end of the exhaust pipe to avoid blockage of the exhaust pipe.

In one embodiment, the cooker body is provided with a base assembly comprising a heating base and a control module. The heating base is controlled by the control module, and the base assembly is cooperated with the cooker cover, so as to realize the heating function. The heating base is controlled by the control module to heat an inner pot, and the cooker cover provided with the pressure cooker assembly is cooperated with the cooker body to realize the pressure cooker function.

In one embodiment, the cooker body is provided with an inner pot and a frying basket. The inner pot is cooperated with the cooker cover provided with the pressure cooker assembly, and the frying basket is cooperated with the cooker cover provided with the air fryer assembly. The inner pot and the frying basket are respectively used in the pressure cooker and the air fryer, and the switch between the functions of the multifunctional cooker is realized through the cooperation between the inner pot or the frying basket and the cooker cover provided with different assemblies.

Compared with the prior art, the present invention has the following characteristics: 1. Through the cooperation between the cooker cover with different assemblies and the cooker body, the switch between pressure cooker function and air fryer function is realized and the purpose of one cooker with multiple functions is realized.

2. Through the switch of the cooker covers cooperated with the cooker body, the switch of the functions of the multifunctional cooker is realized, the problem of the single function of the existing air fryer and the existing pressure cooker is solved, and the practicality of the multifunctional cooker is improved.

DESCRIPTION OF THE EMBODIMENTS

Figure 1:
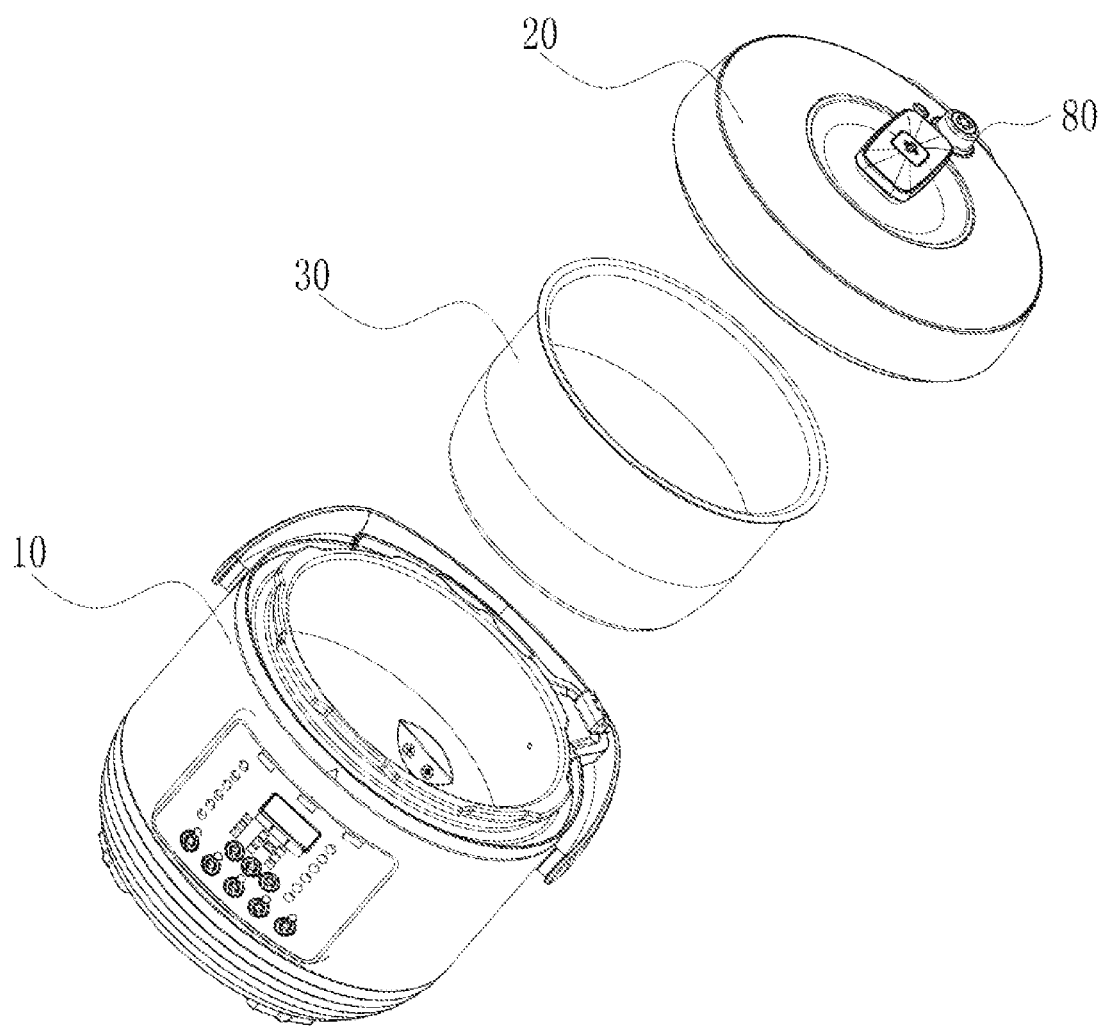
FIG. 1 is a schematic structural view of a multifunctional cooker in an embodiment of the present invention when it realizes the pressure cooker function.

The accompanying drawings are only for exemplary description, and shall not be construed as limiting the present invention. For ease of description for the embodiments, some parts in the accompanying drawings may be omitted, scaled up or scaled down, which do not represent the practical dimensions of the product. For a person skilled in the art, it is understandable that some commonly known structures may be omitted in accompanying drawings and that their descriptions may be omitted. The positional relationship described in the accompanying drawings is for illustrative purposes only, and cannot be understood as limiting to the present invention.

The same or similar reference numerals in the drawings of the embodiments of the present invention correspond to the same or similar components; in the description of the present invention, it should be understood that if there are the terms "upper", "lower", "left", "right", and other terms which indicate the orientation or positional relationship based on the orientation or positional relationship that shown in the drawings, they are only for the convenience of describing the present invention and simplifying the description, rather than indicating or implying that the device or element referred to must have a specific orientation and must be constructed and operated in a specific position. So the terms describing the positional relationship in the drawings are only used for exemplary description, and cannot be understood as a limitation of the present patent. For those of ordinary skill in the art, the specific meaning of the above terms can be understood according to the specific situation.

Embodiment 1

Figure 2:
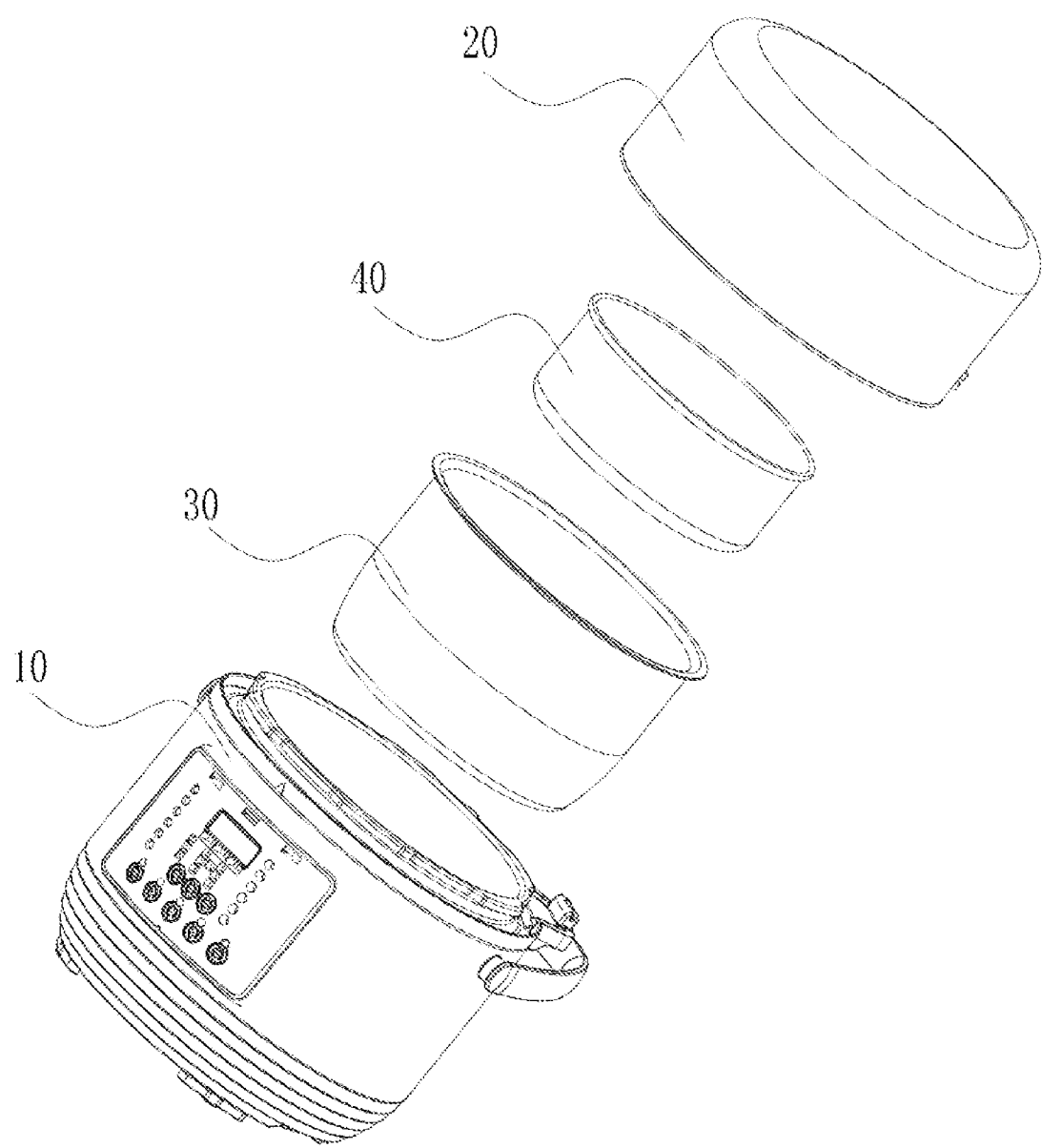
FIG. 2 is a schematic structural view of a multifunctional cooker in the embodiment of the present invention when it realizes the air fryer function.

As shown in FIG. 1 and FIG. 2, the present invention provides a multifunctional cooker comprising a cooker body 10 and cooker covers 20 which are connectable with the cooker body 10. The cooker covers 20 are arranged separately with respect to the cooker body 10. The multifunctional cooker is provided with at least two cooker covers 20, and any one of the at least two cooker covers 20 may be connected to the cooker body 10.

At least one of the cooker covers 20 is provided with an air fryer assembly, and at least one of the cooker covers 20 is provided with a pressure cooker assembly. The cooker cover 20 provided with the air fryer assembly is connected with the cooker body 10, and the air fryer function is realized by the air fryer assembly.

Figure 3:
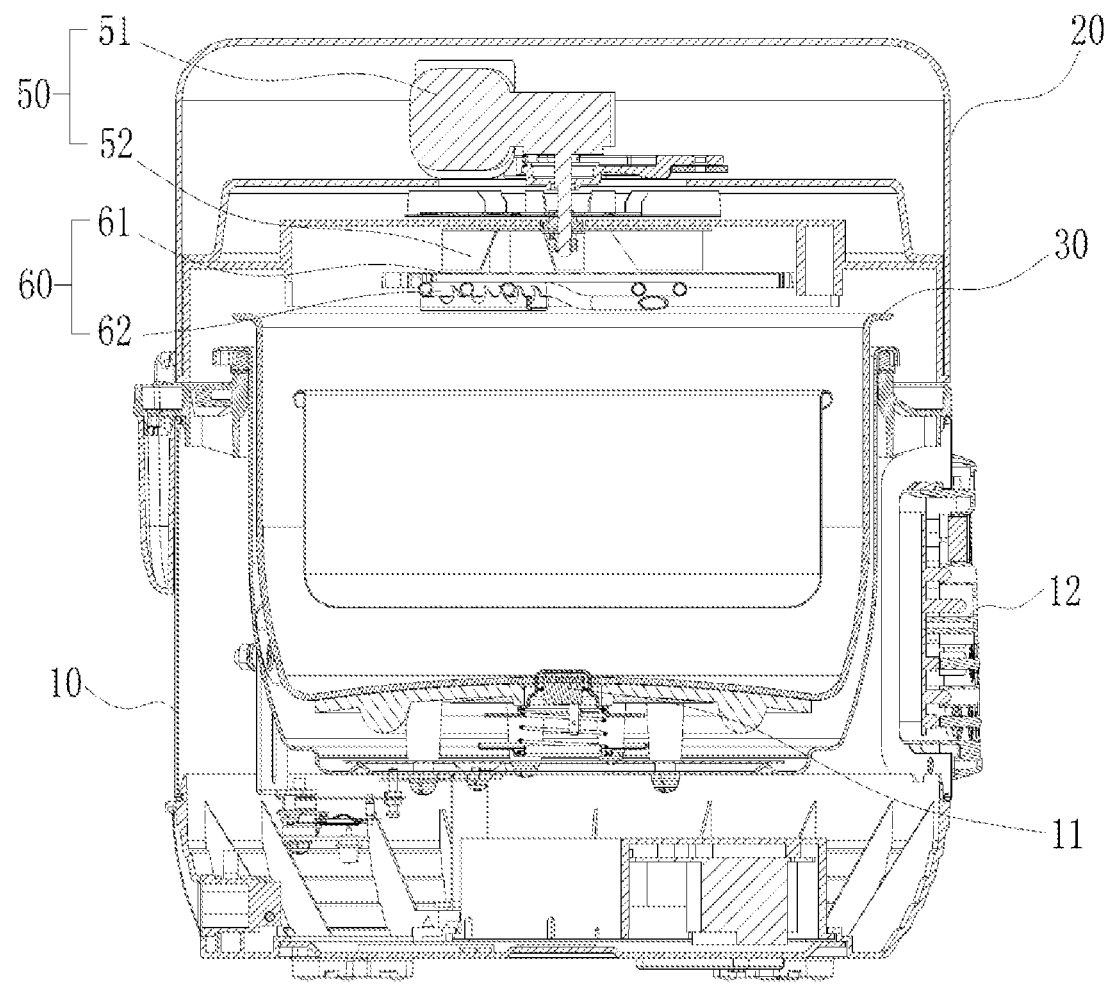
FIG. 3 is a cross-sectional view of the structure of a multifunctional cooker in the embodiment of the present invention when it realizes the air fryer function.

As shown in FIG. 3, the air fryer assembly comprises a heating assembly 60 and a wind power assembly 50, and the heating assembly 60 is cooperated with the wind power assembly 50 to act on a space defined by the cooker cover 20 and the cooker body 10. The heating assembly 60 provides heat and the wind power assembly 50 realizes air flow. The wind power assembly 50 collaborates with the heating assembly 60. When the cooker cover 20 provided with the air fryer assembly is connected with the cooker body 10, flowing of hot air is formed in the cooker body 10. The hot air is used to bake and cook the food to realize the air fryer function of the multifunctional cooker.

Figure 4:
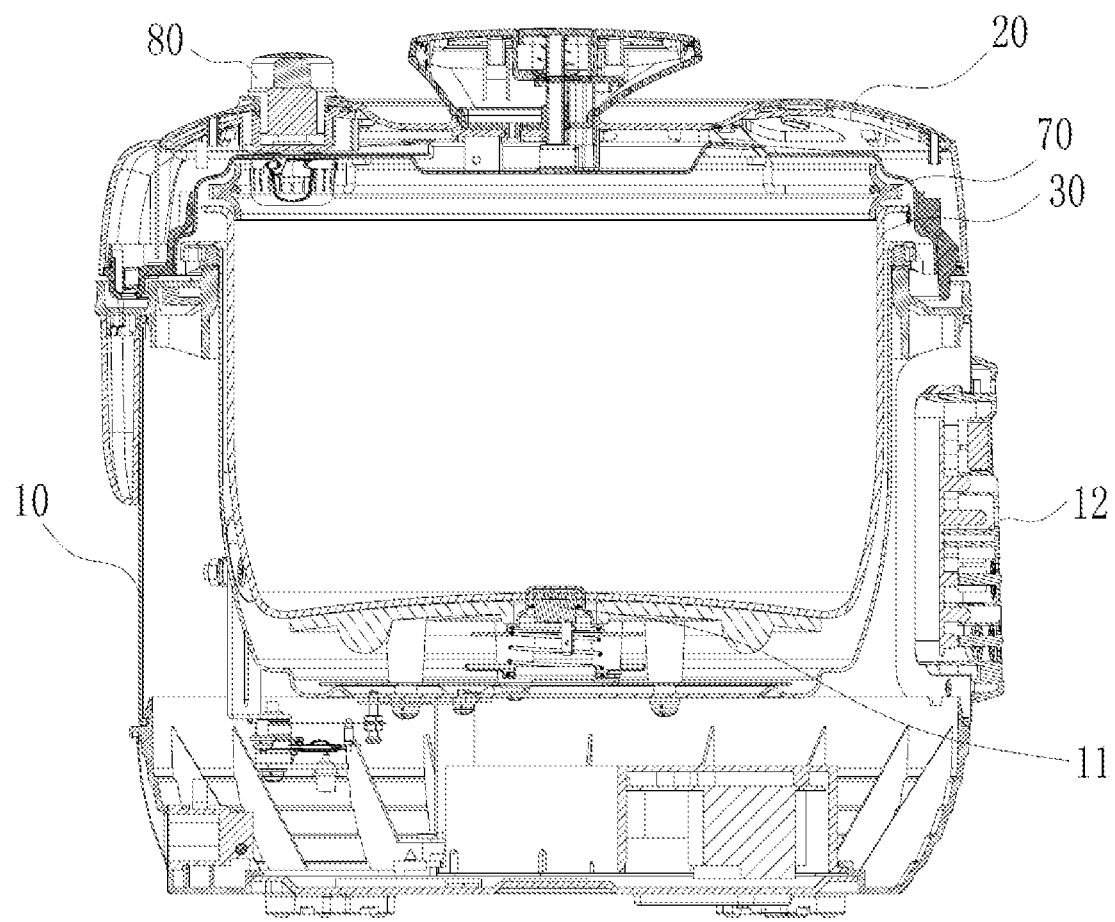
FIG. 4 is a cross-sectional view of the structure of a multifunctional cooker in the embodiment of the present invention when it realizes the pressure cooker function.

As shown in FIG. 4, a cooker cover 20 with a pressure cooker assembly is used to be connected with the cooker body 10. The pressure cooker assembly comprises a pressure limiting valve assembly 80 and a seal housing 70 which are connected with the cooker cover 20, and the sealing housing 70 realizes the sealing for the cooker body 10 when the cooker cover is connected with the cooker body. A pressure is released by the pressure limiting valve assembly 80 when the pressure in the cooker body 10 exceeds a threshold value, thereby realizing the adjustment to the pressure in the cooker body 10.

Figure 5:
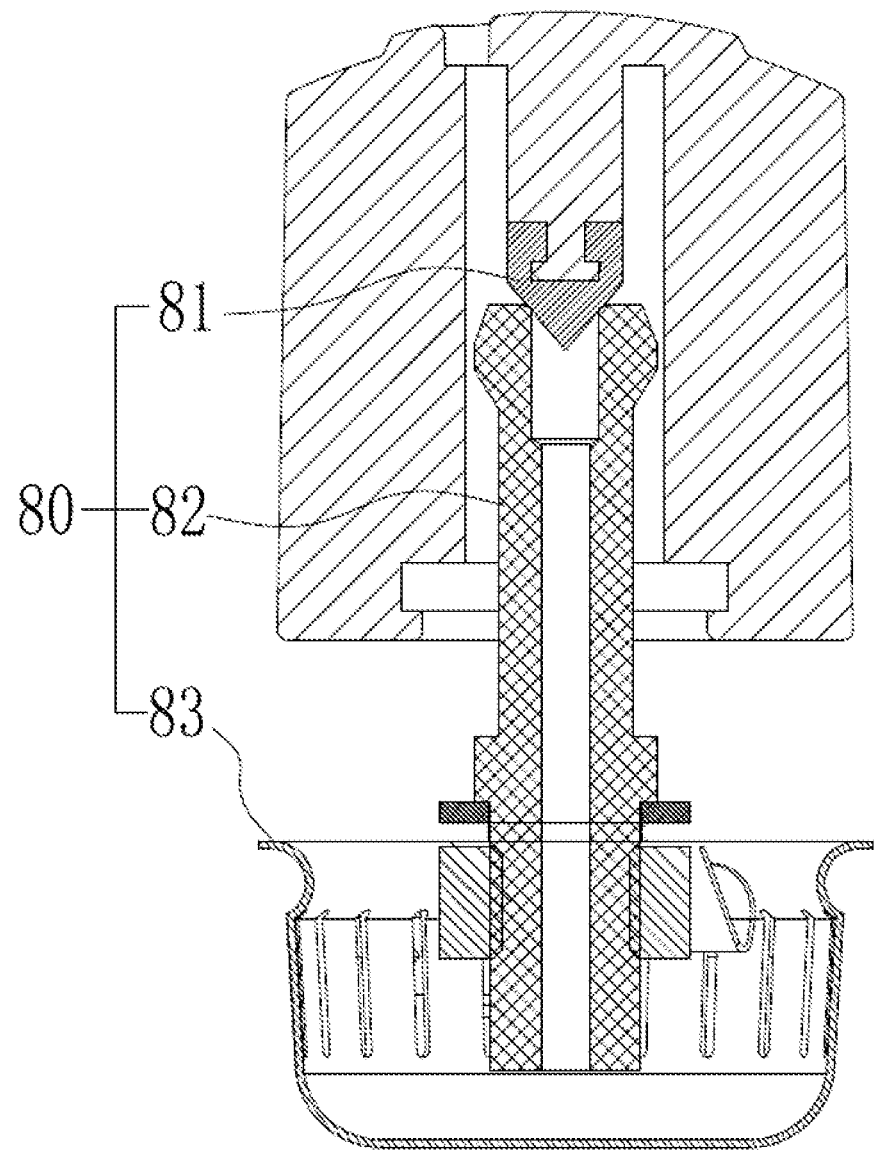
FIG. 5 is a schematic structural view of a pressure limiting valve assembly in the embodiment of the present invention.

As shown in FIG. 5, in the present embodiment, the pressure limiting valve assembly 80 is provided with an exhaust pipe 82 penetrating the cooker cover 20. Both ends of the exhaust pipe are connected with a protective casing 83 and a valve 81 respectively. The valve 81 closes the exhaust pipe 82. When the pressure of the cooker body 10 exceeds the threshold, the valve 81 is opened, and the pressure in the cooker body 10 is released through the exhaust pipe 82. The protective casing 83 prevents the exhaust pipe 82 from being blocked by the food in the cooker body.

In the present embodiment, the cooker body 10 is provided with an inner pot 30 and a frying basket 40. When the cooker cover 20 provided with the air fryer assembly is connected with the cooker body 10, the frying basket 40 is used to be cooperated with the cooker cover 20; when the cooker cover 20 provided with the pressure cooker assembly is connected with the cooker body 10, the inner pot 30 is used to be cooperated with the cooker cover 20.

Embodiment 2

The present embodiment is similar to embodiment 1, except that in the present embodiment, the multifunctional cooker is provided with two cooker covers 20. One cooker cover 20 is provided with an air fryer assembly, and another cooker cover 20 is provided with a pressure cooker assembly. The cooker covers 20 are arranged separately with respect to the cooker body 10, and the two cooker covers 20 are connected alternately with the cooker body 10 to realize the function switch of the multifunctional cooker between the air fryer function and the pressure cooker function.

As shown in FIG. 3, a heat insulation member 61 is provided between the wind power assembly 50 and the wind power assembly 60. The heat insulation member 61 is a heat insulation plate, and the heat insulating member 61 isolates the wind power assembly 60 and the wind power assembly 50, so as to prevent the high temperature of the heating assembly 60 from damaging the wind power assembly 50.

As shown in FIG. 3, in the present embodiment, the heating assembly 60 is a heating tube 62, and the heating tube 62 is arranged to be bent and tortuous to increase the heating area and provide a good heating effect. The wind power assembly 50 is provided with a drive member 51 and a fan 52. The drive member 51 is a motor and the drive member 51 is connected to the fan 52. The fan 52 acts on the heating assembly 60 to realize the flowing of hot air.

As shown in FIG. 3 and FIG. 4, the cooker body 10 is provided with a base assembly comprising a heating base 11 and a control module 12. The heating base 11 is controlled by the control module 12, and the base assembly is cooperated with the cooker cover 20, so as to realize the heating function.

Obviously, the above-mentioned embodiments of the present invention are merely examples for clearly illustrating the present invention, rather than limiting the embodiments of the present invention. For those skilled in the art, other different forms of changes or variations can be made based on the above description. There is no need to exhaustively list all implementations. Any modification, equivalent replacement and improvement made within the spirit and principle of the present invention should be included in the protection scope of the claims of the present invention.

What is claimed is:

1. A multifunctional cooker, comprising a cooker body and two cooker covers which are connectable with the cooker body, wherein the cooker covers are arranged separately with respect to the cooker body, one of the cooker covers is provided with an air fryer assembly, and an other one of the cooker covers is provided with a pressure cooker assembly,
wherein the pressure cooker assembly comprises a pressure limiting valve assembly and a seal housing which are connected with the corresponding cooker cover, and the cooker body is sealed by the sealing housing when the cooker cover is connected with the cooker body, a pressure is released by the pressure limiting valve assembly when the pressure in the cooker body exceeds a threshold value.

2. The multifunctional cooker according to claim 1, wherein the air fryer assembly comprises a heating assembly and a wind power assembly, the heating assembly is cooperated with the wind power assembly to act on a space defined by the corresponding cooker cover and the cooker body.

3. The multifunctional cooker according to claim 2, wherein a heat insulation member is provided between the heating assembly and the wind power assembly.

4. The multifunctional cooker according to claim 2, wherein the heating assembly is a heating tube and the wind power assembly comprises a drive member and a fan.

5. The multifunctional cooker according to claim 1, wherein the pressure limiting valve assembly comprises an exhaust pipe, a protective casing and a valve, the exhaust pipe penetrates the cooker cover, and both ends of the exhaust pipe are connected with the protective casing and the valve respectively.

6. The multifunctional cooker according to claim 1, wherein the cooker body is provided with a base assembly comprising a heating base and a control module, the heating base is controlled by the control module, and the base assembly is cooperated with the cooker cover provided with the pressure cooker assembly, so as to realize a heating function.

7. The multifunctional cooker according to claim 1, wherein the cooker body is provided with an inner pot and a frying basket, the inner pot is cooperated with the cooker cover provided with the pressure cooker assembly, and the frying basket is cooperated with the cooker cover provided with the air fryer assembly.

* * * * *